3,329,681
IRON DIOL COMPLEXES OF SUBSTITUTED PHENANTHROLINES
Francis Patrick Dwyer, deceased, late of Griffith, Australia, by Lola Mary Dwyer, executrix, Griffith, Australia, and Roy Douglas Wright, Parkville, Victoria, and Albert Shulman, Prahran, Victoria, Australia, assignors to The Australian National University, Acton, Canberra, Australia, a body corporate of Australia
No Drawing. Filed Sept. 26, 1963, Ser. No. 311,913
5 Claims. (Cl. 260—270)

This application is a continuation-in-part of application Ser. No. 84,532, filed Jan. 24, 1961, now abandoned.

This invention relates to new iron diol complexes of organic ligands in which the organic ligand groups consist of certain substituted derivatives of 1,10-phenanthroline, so as to form complexes that are heterogeneous. In this specification the term "metal complexes" is to be understood as designating those stable compounds arising from the ability of metals or metal ions to combine with definite numbers of neutral molecules, ions or groups (vide: Kirk-Othmer, "Encyclopedia of Chemical Technology," vol. IV, p. 379, published 1949, by Interscience), whilst the term "ligand" or "ligand group" is to be understood as designating functional or co-ordinating groups which have one or more pairs of electrons available for the formation of co-ordinate bonds (vide: Kirk-Othmer, "Encyclopedia of Chemical Technology," vol. IV, p. 382, published 1949 by Interscience). Numbering of the 1,10-phenanthroline hereinafter is in agreement with ring No. 1954, page 264, of "The Ring Index," A. M. Patterson and L. T. Capell, Monograph Series, published 1940, by Reinhold Publishing Corporation.

According to the present invention there is provided a metal complex of the structure:

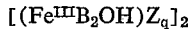

wherein $Fe^{III}$ represents iron (III); wherein B is a phenanthroline of the structure:

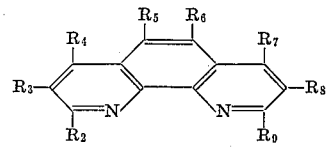

in which $R_2$, $R_3$, $R_4$, $R_5$, $R_6$, $R_7$, $R_8$ and $R_9$ represent a mixture of hydrogen and substituent radicals selected from the group consisting of alkyl, phenyl, tolyl and xylyl; provided that when alkyl substituent radicals are present, there are from two to four of such radicals in said R positions and having a total of two to six carbon atoms, with hydrogen in the remaining R positions; and further provided that when a substituent radical selected from phenyl, tolyl and xylyl is present, there is from one to two of such radicals in the $R_4$, $R_5$, $R_6$ and $R_7$ positions, with hydrogen in the remaining R positions: wherein Z is the anion of an inorganic or organic acid; and wherein $q$ is such that the product of $q$ and the valence of Z is two.

The new iron diol complexes of the invention can be prepared by the method which comprises reacting an appropriate ferric salt with an appropirate amount of a substituted 1,10-phenanthroline as specified, in a liquid medium containing a substantial amount of water and under such acid condition as will give a pH of 2 to 4 at the end of the reaction, and recovering the desired complex from the solution. In carrying out this method, the iron salt may be dissolved in a suitable aqueous medium, whilst the substituted 1,10-phenanthroline base may be dissolved in a suitable water-miscible solvent, the two solutions mixed and reacted together under such acid conditions as to produce a pH from 2 to 4 in the solution at the end of the reaction, and the desired end product separated by crystallisation or other conventional procedures. Any water-soluble ferric salt may be used, dissolved advantageously in water, whilst any mineral acid is suitable for acidification of the reaction mixture. The substituted 1,10-phenanthroline base is conveniently dissolved in a water-miscible alcohol or other water-miscible organic solvent. The most convenient ferric salt starting material is ferric ammonium alum, in this case the complex being best isolated by the addition of solid ammonium sulphate, alternatively, the complex may be precipitated as the perchlorate or other insoluble derivative.

Examples of substituted phenanthrolines which can be used in the preparation of the complexes herein are:

3,4,7,8,-tetramethyl-1,10-phenanthroline;
4,7-dimethyl-1,10-phenanthroline;
3,4,7-trimethyl-1,10-phenanthroline;
3,4-dimethyl-1,10-phenanthroline;
2,4,7,8-tetramethyl-1,10-phenanthroline;
2,4,7,9-tetramethyl-1,10-phenanthroline;
2,9-dimethyl-1,10-phenanthroline;
2,7,8-trimethyl-1,10-phenanthroline;
5-phenyl-1,10-phenanthroline;
4,7-diphenyl-1,10-phenanthroline;
4,7-ditolyl-1,10-phenanthroline;
4,7-dixylyl-1,10-phenanthroline;
4-phenyl-1,10-phenanthroline;
4-tolyl-1,10-phenanthroline;
4-xylyl-1,10-phenanthroline;
3,5,6,8-tetramethyl-1,10-phenanthroline;
5,6-dimethyl-1,10-phenanthroline;
3,4,8-trimethyl-1,10-phenanthroline;
3,8-dimethyl-1,10-phenanthroline;
3,4,5,6-tetramethyl-1,10-phenanthroline;
3,5,6-trimethyl-1,10-phenanthroline;
4,7-diethyl-1,10-phenanthroline;
4,7-dipropyl-1,10-phenanthroline;
4,5-dimethyl-1,10-phenanthroline;
3,8-dimethyl-4,7-diethyl-1,10-phenanthroline; and
3,8-diethyl-5,6-dimethyl-1,10-phenanthroline.

The anion of the present complexes, represented by symbol Z in the formula defined above, may be derived from any suitable inorganic or organic acid. A representative list of the anions includes sulfate, chloride, bromide, iodide, phosphate, nitrate, acetate, sulfamate, citrate, lactate, maleate, malate, succinate, tartrate, cinnamate, benzoate, gluconate, ascorbate, saccharate, stearate and oleate. These anions can be introduced by double decomposition reactions as illustrated in the practical examples below, or, say, by ion exchange resins. Different solubility effects can be obtained by choice of the anion, for example, the saccharate anion has value in increasing the water-solubility of the complexes, whilst anions such as stearate or oleate decrease water-solubility of the complexes.

Metal complexes in accordance with the invention are extremely valuable as therapeutic agents for the treatment of animal and plant diseases induced by a wide variety of organisms. In particular, the complexes are extremely valuable for the treatment of various topical infections in humans, in the treatment of bovine mastitis, in the treatment of plant fungal conditions, and as anthelmintic. These complexes have special value in being active against a wide variety of microorganisms, i.e. Gram-positive organisms, Gram-negative organisms, Acid-fast organisms, pathogenic fungi, yeast (*Saccharomyces cerevisiae*) and virus (influenza). Moreover, organisms, like *Staphylococcus pyogenes* do not develop any significant resistance to the complexes which are equally active against organisms which have developed resistance to any type of antibiotics in current use; this applies particularly to *Staphylococcus pyogenes*. In addition, the complexes are stable (solutions are not destroyed by bacterial or host metabolism nor by physical means, e.g., autoclaving 15 lbs. pressure for 20 minutes for sterilisation), and are non-irritant at very high concentrations (1 to 2% solutions) to skin surfaces, mucous surfaces (eye, ear, nose, (throat), mucous cavities (vagina, gut, bladder) and subcutaneous tissues (muscle, bone). Naturally-coloured complexes may be used with safety where required.

In the use of the present complexes as therapeutic agents for topical applications in infective disorders, the complexes of necessity, come into contact with host cells. An important factor in their effectiveness in the control of infection is the differential sensitivity to the complexes between the infective agent and the host cells at the site of infection. The sensitivity of Gram-positive infective organisms such as *Staphylococcus pyogenes* to the complexes is very high (between 3.1–25.0 microg./ml.). The presence of plasma tissue fluid and infective exudates does not impair the action of the complexes to any appreciable extent. At the concentrations of complex effective against microorganisms there is no toxic action upon the host tissue with prolonged application of the complex nor any adverse effect upon regeneration of epithelial tissue.

In the treatment of bovine mastitis, the present complexes are effective clinically in resolving acute and chronic infections due to *Streptococcus pyogenes* (Group B) or *Staphylococcus pyogenes* which have proved refractory to the antibiotics in current use for the purpose. No significant resistance is developed by the streptococci or staphylococci to those complexes either in-vitro or in-vivo. Variant forms of these organisms may be reproduced which generally show markedly decreased virulence. The present complexes also appear to gain access to chronic walled-off lesions which may act as foci of infection.

In the treatment of plant diseases due to microorganisms, in particular, plant fungi and nematodes, tests have been conducted against the plant fungi *Venturia inaequalis* and *Phytophthora infestans,* and against the plant nematodes *Panagrellus redivivis* and *Meloidogyne incognita*. *Venturia inaequalis* causes "black spot" on apples; *Phytophthora infestans* causes "late blight" of tomatoes and potatoes; and the nematodes cause root infestations of plants. Excellent control of these organisms has been obtained with several of the present complexes which have been tested.

We believe that the metal complexes prepared according to the invention exert their therapeutic action by their capacity to bind or attach themselves to essential biological sites (enzymes and proteins) by electrostatic and/or Van der Waal's forces. When the active receptor site is on the surface of the biological cell direct adsorption of the metal complex suffices, provided that it is bound sufficiently firmly, but when the active site is located within the biological cell, penetration of the metal complex is essential for therapeutic effectiveness. Both penetration and binding of the complexes is enhanced by the selected substitution of the prime ligand 1,10-phenanthroline, which functions as the complexing or metal binding agents. Thus, whereas metal complexes of the prime ligand 1,10-phenanthroline have relatively inferior penetration powers and relatively inferior capabilities of binding to sites within or without cells, the properties of penetrability and strong adsorption increases markedly with selected substitution as specified herein. The selected substituents show increased preference for the lipid (fat) phase of the cell membrane and which by reason of factors, such as molecule size, give, we consider, the complex molecule a sufficiently large surface for Van der Waals binding or adsorption. Other substituents have unfavourable effects on penetrability, whilst not contributing notably to surface area of the complex. The metal complex as a whole, and not traces of either metal or dissociated ligand, is the effective biological agent.

In addition, substituents in the prime ligand other than those specified herein affect very unfavourably the stability of the complexes towards reduction. The diol linkage between the two iron atoms is preferred to, for example, a dichloro bridge because of the very strong bonding of iron to oxygen which tends to preserve the intactness of the very large bridged dimeric structure. Thus, the unsubstituted phenanthroline iron (III) diol complexes are both unstable in aqueous solutions and especially under the reducing conditions that occur on biological surfaces. Decomposition yields the red tris-complexes. On the other hand, stability is greatly improved by the alkyl and aryl substituents in the phenanthroline nuclei, as specified. These substituents, we consider, have the effect of making the donor nitrogen atoms more basic, and hence increasing markedly the strength of bonding of the ligand with the iron atom, whilst possibly a more important effect of substitution on the stability towards reduction is the change in the oxidation-reduction potential which moves into the region of stability of the iron (III) state rather than the iron (II) state. We have found that symmetrical substitution of the 1,10-phenanthroline base ligand as specified contributes to a high activity in combatting bacterial infections in humans and gives highly stable complexes.

Complexes according to the invention can be prepared as illustrated in the following practical example. The starting materials, i.e. metal salts and substituted bases, are either known or can be prepared by standard procedures.

*Example 1*

Tetrakis(3,4,7,8-tetramethyl-1,10-phenanthroline) diol iron (III) sulphate is prepared as follows: Ferric ammonium alum (4.0 g.) is dissolved in 200 ml. of water at 40° C. containing 1/N sulphuric acid (1 ml.). The solution is then heated at 75° C., and 3,4,7,8-tetramethyl-1,10-phenanthroline (5.0 g.) in the minimum volume of hot alchohol (20 ml.) added gradually over 2 minutes. The red-brown solution is maintained at 75° C. for 10–15 minutes, and then solid ammonium sulphate (20 g.) added. The solution is allowed to cool and after 1.5 hours, the brownish-yellow precipitate is collected, washed with ice water, and dried in the air. The compound has the formula $[Fe(C_{16}H_{16}N_2)_2OH]_2$—$(SO_4)_2$·aq.

*Example 2*

Using the procedure of Example 1 except that 3,5,6,8-tetramethyl-1,10-phenanthroline and ferric chloride 6H$_2$O and hydrochloric acid and ammonium chloride are employed as reaction components, the complex tetrakis(3,5,6,8-tetramethyl-1,10-phenanthroline) iron diol (III) chloride is prepared.

*Example 3*

Using the procedure of Example 1 except that 4,7-diphenyl-1,10-phenanthroline and ferric bromide·6H$_2$O and hydrobromic acid and ammonium bromide are employed as reaction components, the complex tetrakis(4,7-diphenyl-1,10-phenanthroline) iron diol (III) bromide is prepared.

*Example 4*

Using the procedure of Example 1 except that 4,7-diethyl-1,10-phenanthroline and ferric phosphate·2H$_2$O and phosphoric acid and ammonium phosphate are employed as reaction components, the complex tetrakis(4,7-diethyl-1,10-phenanthroline) iron diol (III) phosphate is prepared.

*Example 5*

Using the procedure of Example 1 except that 3,4,7-trimethyl-1,10-phenanthroline and ferric nitrate·6H$_2$O and nitric acid and ammonium nitrate are employed, as reaction components, the complex tetrakis(3,4,7-trimethyl-1,10-phenanthroline) iron diol (III) nitrate is prepared.

*Example 6*

Using the procedure of Example 1 except that 4,7-dimethyl-1,10-phenanthroline and basic ferric acetate and acetic acid and ammonium acetate are employed as reaction components, the complex tetrakis(4,7-dimethyl-1,10-phenanthroline) iron diol (III) acetate is prepared.

*Example 7*

Tetrakis(5-phenyl-1,10-phenanthroline) iron diol (III) iodide is prepared from the equivalent sulfate by dissolving the salt in water and adding sodium to precipitate the desired complex. Said equivalent sulfate is prepared using the procedure of Example 1 except that the phenanthroline component is 5-phenyl-1,10-phenanthroline.

*Example 8*

Tetrakis(4,7-dimethyl-1,10-phenanthroline) iron diol (III) stearate is prepared using the procedure of Example 7 except that 4,7-dimethyl-1,10-phenanthroline is the phenanthroline component and sodium stearate is used instead of sodium iodide.

*Example 9*

Tetrakis(3,8-dimethyl - 4,7 - diethyl - 1,10-phenanthroline) iron diol (III) oleate is prepared using the procedure of Example 7 except that 3,8-dimethyl-4,7-diethyl-1,10-phenanthroline is the phenanthroline component and sodium oleate is used instead of sodium iodide.

Bacteriostatic tests with tetrakis(4,7-dimethyl-1,10-phenanthroline) diol iron (III) suphate and tetrakis(3,5,6,8-tetramethyl-1,10-phenanthroline) diol iron (III) sulphate were carried out with respect to inhibitory concentration expressed in micrograms/milliliter against *Staphylococcus pyogenes* (Oxford), *Streptococcus pyogenes* (Group A), and *Clostridum welchii* in the medium specified below. This gave the results for each complex respectively of 25, 50 and 100; and, 3.1, 6.25 and 50. The tests were carried out in 2.5 ml. quantities of sterile "Difco" heart-infusion broth containing 10% horse serum and the test compound. In the case of *Cl. welchii*, 2 drops of a sterile 10% sodium thioglycollate solution were added aseptically to the medium. The inoculum in each case was a drop (0.02 ml.) of an 18 hour culture of the organism and the incubation period at 37° C. was 48 hours. The plant fungicidal value of tetrakis(3,4,7,8-tetramethyl-1,10-phenanthroline) diol iron (III) sulphate was tested on *Venturia inaequalis* and *Phytophthora infestans*. The complex gave excellent fungical results at a concentration of 100 p.p.m. against both organisms.

Application of the present compleves in the fields of animal and plant thereby is effected by means of a carrier or diluent for the complex. For example, in the therapeutic treatment of bacterial infections in humans, the complex is applied in forms such as saline solutions, creams, lotions, nose or eye or ear drops, pessaries, suppositories, tablets, lozenges, and the like. A dermatological or vaginal cream may contain 10 mgm./gm. of the complex in the cream base; a lotion may contain 10 mgm./ml. of the complex; a saline solution may contain 5–10 mgm./ml. of the complex; nose drops may contain 10 mgm./ml. of the complex in saline; eye drops may contain 4 mgm./ml. of the complex in saline; ear drops may contain 10 mgm./ml. of the complex in propylene glycol; 5 gram pessaries and suppositories may contain 50 mgm. of the complex; and 500 mgm. oral tablets may contain 250 mgm. of the complex. Likewise, in veterinary treatments, such as bovine mastitis, the complexes are applied in a suitable carried media, such as paraffin and wax base, whilst in veterinary anthelmintic preparations, the complexes are applied conveniently as a drench, preferably as an aqueous solution or aqueous suspension of the complex, depending upon its water solubility. When applied as plant fungicides or as plant virocides, the water-insoluble complexes conveniently are formulated as dispersible powders. whilst the water-soluble complexes are formulated as aqueous solutions, however, concentrate-forms of the complexes in organic solvent solutions may be prepared for further use, such as the preparation of aqueous emulsions of the complexes, and, any of these formulations may include wetting agents and/or other materials of assistance in formulating the complexes or in their end use.

We claim:

1. Tetrakis(substituted 1,10-phenanthroline) iron diol salts wherein the anions are selected from the class consisting of sulfate, chloride, bromide, phosphate, nitrate, acetate, iodide and stearate, and wherein the -1,10-phenanthroline substituents are selected from the combinations as follows:
   3,4,7,8-tetramethyl,
   3,5,6,8-tetramethyl,
   4,7-diphenyl,
   3,4,7-trimethyl,
   5-phenyl.

2. Tetrakis(3,4,7,8-tetramethyl - 1,10-phenanthroline) iron diol (III) sulfate.

3. Tetrakis(5-phenyl-1,10-phenanthroline) iron diol (III) sulfate.

4. Tetrakis(3,5,6,8-tetramethyl - 1,10-phenanthroline) iron diol (III) sulfate.

5. Tetrakis(4,7-diphenyl-1,10-phenanthroline) iron diol (III) sulfate.

References Cited

UNITED STATES PATENTS

| | | | |
|---|---|---|---|
| 2,809,146 | 10/1957 | Osborn | 167—33 |
| 2,809,197 | 10/1957 | Kruse | 260—270 |
| 3,052,677 | 9/1962 | Erner | 260—270 X |
| 3,147,182 | 9/1964 | Masci et al. | 167—33 |

OTHER REFERENCES

Blank: Nature, volume 168, pages 516–7 (1951).

Brandt et al.: Chemical Reviews, volume 54 (1954), pages 961–9, 991–5 and 1008 relied on.

Gaines et al.: J. Am. Chem. Soc., volume 58, pages 1668–74 (1936).

O'Reilly: Aust. J. of Chemistry, volume 13, pages 145–9 (1960).

ALEX MAZEL, *Primary Examiner.*

DONALD G. DAUS, *Assistant Examiner.*